United States Patent [19]

Nishimura et al.

[11] Patent Number: 5,240,200
[45] Date of Patent: Aug. 31, 1993

[54] TAPE CASSETTE

[75] Inventors: Akihiro Nishimura, Higashi-Osaka; Toru Ichimura, Neyagawa; Shuji Uematsu, Toyono; Yoshinori Shiomi; Kenji Iwano, both of Tsuyama, all of Japan

[73] Assignee: Matsushita Electric Industrial Co., Ltd., Kadono, Japan

[21] Appl. No.: 677,130

[22] Filed: Mar. 29, 1991

[30] Foreign Application Priority Data

Mar. 31, 1990 [JP] Japan .................................. 2-86566
Oct. 12, 1990 [JP] Japan ................................. 2-273551
Oct. 12, 1990 [JP] Japan ................................. 2-273552

[51] Int. Cl.$^5$ .......................... G03B 1/04; G11B 15/32
[52] U.S. Cl. ..................................... 242/199; 360/96.5
[58] Field of Search .................. 242/198, 199; 360/94, 360/95, 965, 966, 132

[56] References Cited

U.S. PATENT DOCUMENTS

| | | | |
|---|---|---|---|
| 3,900,170 | 8/1975 | Serizawa | 360/132 X |
| 3,971,071 | 7/1976 | Urayama | 242/199 X |
| 4,631,607 | 12/1986 | Katsumata | 360/96.5 |
| 4,786,996 | 11/1988 | Ohtani et al. | 360/94 |
| 4,803,575 | 2/1989 | Nishimura et al. | 360/132 |
| 4,844,377 | 4/1989 | Shiomi et al. | 242/199 X |
| 4,853,805 | 8/1989 | Baranski | 360/94 |
| 4,864,439 | 9/1989 | Duurland | 360/96.5 |

FOREIGN PATENT DOCUMENTS 63-55789 3/1988 Japan .
WO89/04539 5/1989 PCT Int'l Appl. .

Primary Examiner—Daniel P. Stodola
Assistant Examiner—John Rollins
Attorney, Agent, or Firm—Wenderoth, Lind & Ponack

[57] ABSTRACT

A set of tape cassettes of successively larger sizes, each cassette having a housing elongated in a longitudinal direction and having a front face with a tape accommodating opening symmetrical about a center line extending in a lateral direction transverse to the longitudinal direction and midway between side faces of the housing, the housing further having a bottom face with a plurality of cassette guide grooves therein parallel to each other and extending transversely of the housing and engagable with guide projections on a cassette holder for guiding the cassette into the cassette holder. The opening and the cassette guide grooves in each cassette are in the same position relative to the center line of the cassette housing, and a distance in the longitudinal direction between neighboring cassette guide grooves and a distance in the longitudinal direction between the cassette guide grooves closest to the side faces and the side faces in the housing of each of the tape cassettes of the set other than the smallest cassette of the set are smaller than a width of the smallest of the cassettes in the set in the lateral direction. Thus, erroneous insertion of the cassettes into the cassette holder in the longitudinal direction of the cassettes is prevented.

15 Claims, 19 Drawing Sheets

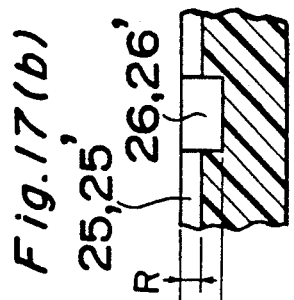
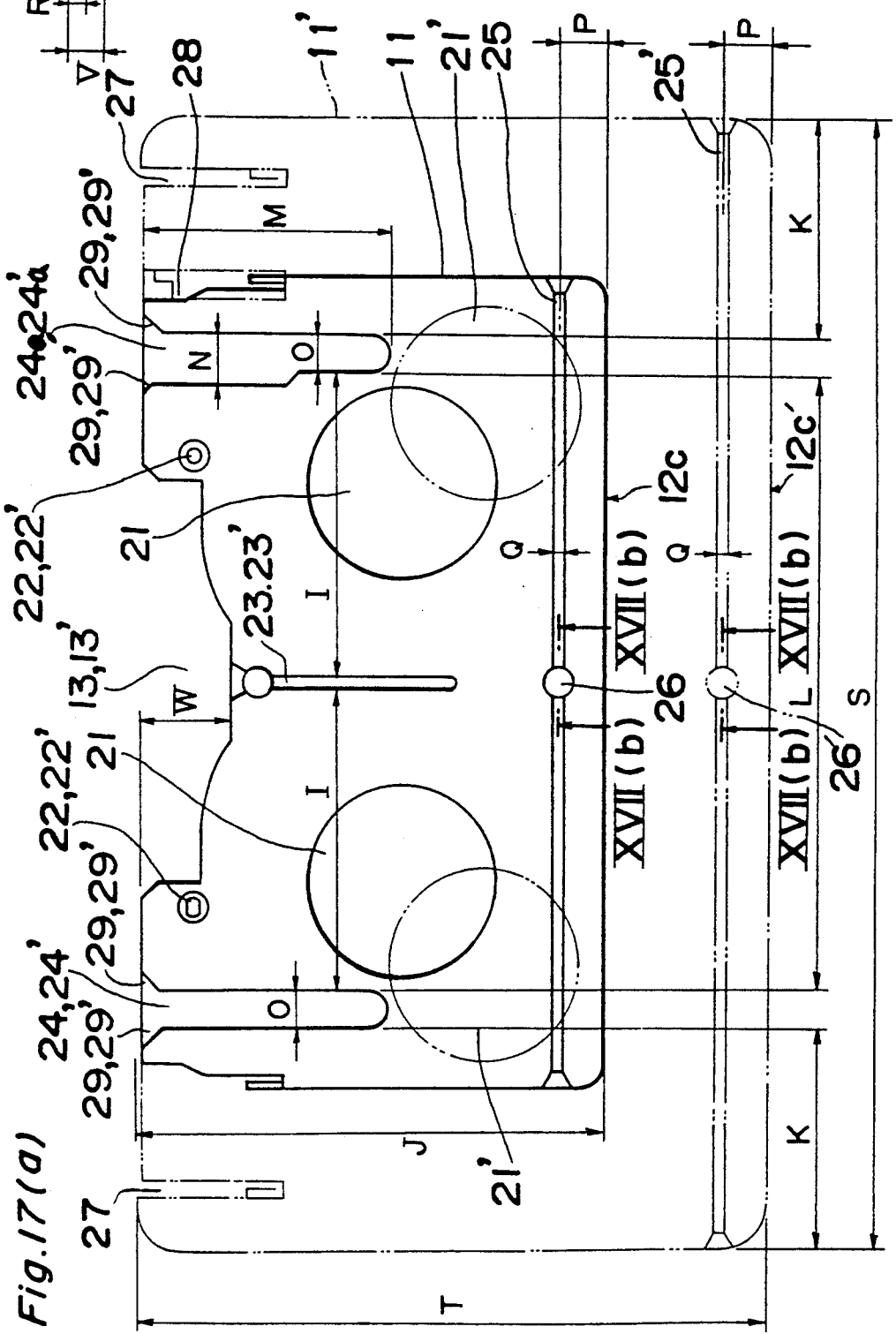

TAPE CASSETTE

BACKGROUND OF THE INVENTION

The present invention generally relates to a set of magnetic tape cassettes and more particularly, to a set of tape cassettes most suitable for use in a magnetic recording and reproducing apparatus such as a video tape recorder and the like or various kinds of other information processing apparatuses, etc.

Recently, there has been introduced into the market a video tape recorder (referred to as VTR hereinafter) capable of loading a plurality of tape cassettes of different sizes, but with the same format. Therefore, such VTR has a complicated mechanism, and tends to give rise to various troubles when various tape cassettes of different sizes are to be loaded therein.

CONVENTIONAL EXAMPLE I

Hereinafter, conventional tape cassettes of different sizes for use in the VTR as referred to above will be explained with reference to FIGS. 1-10.

As is well known, each of such large and small tape cassettes has a cassette shell housing constituted by combining an upper half portion and a lower half portion, and a set of reels wound with a magnetic tape and accommodated within the cassette shell housing, with a cover member being provided at a front opening portion of the shell housing for protection of the stretched magnetic tape.

As shown in FIG. 1, in only a bottom face of the large tape cassette 1, a first cassette guide groove 2 is formed at a central portion of the bottom face for guiding the tape cassette 1 to a predetermined position when said tape cassette is inserted into a cassette holder (not shown) of the VTR in a direction indicated by an arrow A. Moreover, a second cassette guide groove 3 is also formed along a rear side edge of the tape cassette 1 for guiding the tape cassette 1 to a position to be inserted into the cassette holder in a direction indicated by an arrow B.

Numeral 3a represents a detection hole to be used when erroneous erasing of information recorded on the magnetic tape is to be prevented.

FIG. 2 shows the small tape cassette 1' in which like parts to those of the large tape cassette 1 in FIG. 1 are designated by like reference numerals with primes affixed thereto, and a detailed description thereof is omitted for brevity of explanation.

It is to be noted here that, when a depth of the small tape cassette 1' is represented by C, and a distance between the first cassette guide groove 2 to each side face of the large tape cassette 1 is denoted by D, the relation between D and C is D>C.

It should also be noted here that the detection holes 3a and 3a' are located at the same distance from the rear faces of the respective tape cassettes 1 and 1'.

When the large or small tape cassette 1 or 1' is to be loaded into a VTR, said tape cassette is inserted into a tape holder 4 provided with a cassette guide protrusion 5 as shown in FIG. 3. During such insertion, the cassette guide protrusion 5 is received in the first guide groove 2 or 2' of the large or small tape cassette 1 or 1' so as to restrict the cassette to a predetermined position.

By the provision of this first cassette guide groove 2 or 2' and the cassette guide protrusion 5, the erroneous insertion of the tape cassette 1 or 1' with respect to the upper or reverse face thereof, i.e. upside down insertion, can be prevented.

However, in the arrangement as described above, since it is intended to positionally restrict the large or small tape cassette 1 or 1' by the one cassette guide protrusion 5 at the central portion of the holder 4 as shown in FIG. 4, side play in directions indicated by arrows E is increased within the cassette holder 4 particularly in the case of the large tape cassette 1, with a consequent unstability in the positional restriction, thus constructing smooth loading of the tape cassette into the VTR.

Additionally, since the distance between the cassette guide protrusion 5 of the cassette holder 4 and each side face of said cassette holder 4 is larger than the distance C referred to earlier, there has been a serious problem that the small tape cassette 1' can be erroneously inserted side face first and longitudinally, so that it enters the interior of the VTR, thereby damaging internal mechanisms (FIG. 5).

CONVENTIONAL EXAMPLE II

Subsequently, large and small tape cassettes have been developed in which the unstability of positional restriction as explained in the above conventional Example I has been prevented, and these will be explained.

It is to be noted here that, since the fundamental construction of such large and small tape cassettes is similar to those in the conventional Example I, a detailed description thereof is omitted for brevity of explanation.

As shown in FIG. 6, on only the bottom face of the large tape cassette 6, a set of cassette guide grooves 7 are formed parallel to and spaced inwardly from the opposite side faces of the tape cassette 6 for guiding said tape cassette to the predetermined position in the cassette holder (not shown here).

The distance F between said cassette guide grooves 7 is made to be generally equal to a longitudinal length F' between the side faces of the small tape cassette 6' shown in FIG. 7.

The large tape cassette 6 is also formed with a second cassette guide groove 8 on its bottom face along the rear face thereof.

As shown in FIG. 7, the small tape cassette 6' is not provided, on its bottom face, with a set of cassette guide grooves 7 as in the large tape cassette 6, but is only provided with a guide groove 8' similar to the above second cassette guide groove 8 along the rear face thereof.

Moreover, the second cassette guide grooves 8 and 8' are at an equal distance from the rear faces of the respective tape cassettes 6 and 6' to the center of the width of said grooves 8 and 8'. However, the widths and depths of the respective second cassette guide grooves 8 and 8' are different from each other.

When the large or small tape cassette 6 or 6' is to be loaded into a VTR, said tape cassette is inserted into a tape holder 9 provided with a set of cassette guiding protrusions 10 as shown in FIG. 8.

During the above insertion, in the case of the small tape cassette 6, said cassette 6' is subject to positional restriction to a predetermined position in the cassette holder 9 with the set of the cassette guiding protrusions 10 contacting opposite side faces of the tape cassette 6' as shown in FIG. 9.

In the case of the large tape cassette 6, the set of cassette guide protrusions 10 are received by the corresponding set of cassette guide grooves 7 of the tape cassette 6 for the positional restriction of said tape cassette 6 at the predetermined position.

As described above, if such set of tape cassette guide means having a certain interval therebetween is employed, the undesirable side play of the large or small tape cassette 6 or 6' in the cassette holder 9 can be reduced as compared with that in the conventional Example I, and thus, the positional restriction may be stably achieved.

However, in the known arrangement as described so far, since the distance F between the set of cassette guide protrusions 10 (or the set of grooves 7 in the large cassette 6) is larger than a depth G of the small tape cassette 6' (P>G), as shown in FIG. 10, if the small tape cassette 6' is inserted into the cassette holder 9 side face first by mistake, it enters the inner mechanism of the VTR, thus resulting in breakage of the VTR. This is the same problem as with the tape cassettes of the conventional Example I.

Moreover, in the above conventional arrangement, there has also been a disadvantage that, since the cassette guide protrusions 10 are provided at the left and right portions of the cassette holder 9, it is required to pay attention to the positions both of the protrusions 10 at the left and right sides during insertion of the large or small tape cassette 6 or 6', thus resulting in some difficulty for the insertion of the large or small tape cassette 6 or 6'.

SUMMARY OF THE INVENTION

Accordingly, an essential object of the present invention is to provide a set of a plurality of tape cassettes of different sizes, e.g. small and large tape cassettes, to be loaded in a cassette holder of a video tape recorder or the like, in which erroneous insertion of the small tape cassette side end first in a longitudinal direction into the video tape recorder or the like is advantageously prevented.

Another object of the present invention is to provide a set of tape cassettes of the above-described type which may be stably and readily subjected to positional restriction upon loading thereof into the cassette holder.

In accomplishing this and other objects, according to the present invention, arrangements are made as follows.

(1) If the distance between the plurality of cassette guide grooves is represented by I and the depth of the small tape cassette is denoted by J, the distance I and depth J are such that the relation is J>I.

(2) Inclined faces are provided at the entrance openings of a pair of cassette guide grooves, and a width N of one cassette guide groove just inwardly of the entrance opening is made larger than a width O thereof toward the inner end of the groove.

By the above arrangement (1) of the present invention, since the plurality of cassette guide grooves are spaced at an interval smaller than the depth of the small tape cassette, with corresponding protrusions being provided on the cassette holder, even if the small tape cassette is inserted into the cassette holder side edge first in a wrong direction by mistake, it is obstructed by the protrusions so that it cannot enter the VTR, and thus the serious problem related to the breakage of the VTR can be advantageously eliminated.

Furthermore, by the above arrangement (2), since the inclined faces are provided at the entrance openings of the cassette guiding grooves, while the width of one of the grooves just inwardly of the entrance opening is made larger than that toward the inner end, engagement between the cassette guide protrusions and the cassette guide grooves may be effected smoothly.

More specifically, according to one aspect of the present invention, there is provided a set of tape cassettes which includes a plurality of tape cassettes, which can be loaded into the same cassette holder, and each of said tape cassettes is provided only on a bottom face thereof, with a plurality of cassette guide grooves for guiding said tape cassette into the cassette holder, with an interval between at least two guide grooves of the plurality of cassette guide grooves being smaller than a depth of the smallest tape cassette in the plurality of tape cassettes (the above arrangement (1)).

Meanwhile, in another aspect of the present invention, the tape cassette means includes a cassette housing in which reels wound with a magnetic tape are accommodated, and a plurality of cassette guide grooves provided on a bottom face of the cassette shell housing, with said cassette guide grooves having, at entrance opening portions thereof, inclined faces (the above arrangement (2)).

BRIEF DESCRIPTION OF THE DRAWINGS

These and other objects and features of the present invention will become apparent from the following description taken in conjunction with the accompanying drawings, in which:

FIG. 17(a) is a top plan view for explaining the positional relation of the arrangements of the grooves on the bottom faces of the large and small tape cassettes according to the present invention;

FIG. 17(b) is a cross section on an enlarged scale, taken along either of the lines 17b—17b in FIG. 17(a);

DETAILED DESCRIPTION OF THE INVENTION

Figure 1:
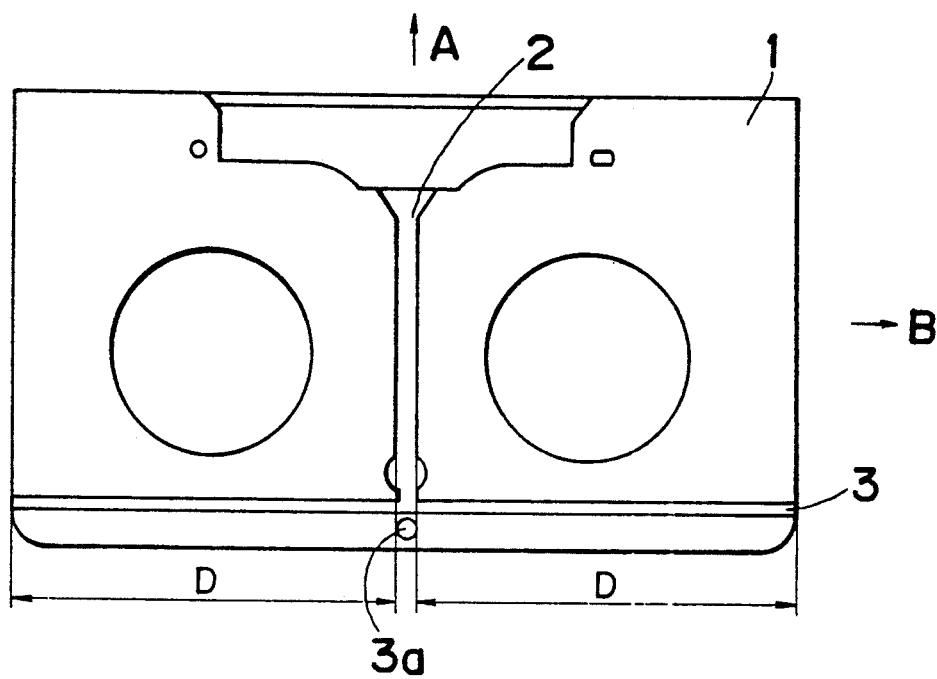
FIG. 1 is a bottom plan view of a conventional large tape cassette.
Figure 2:
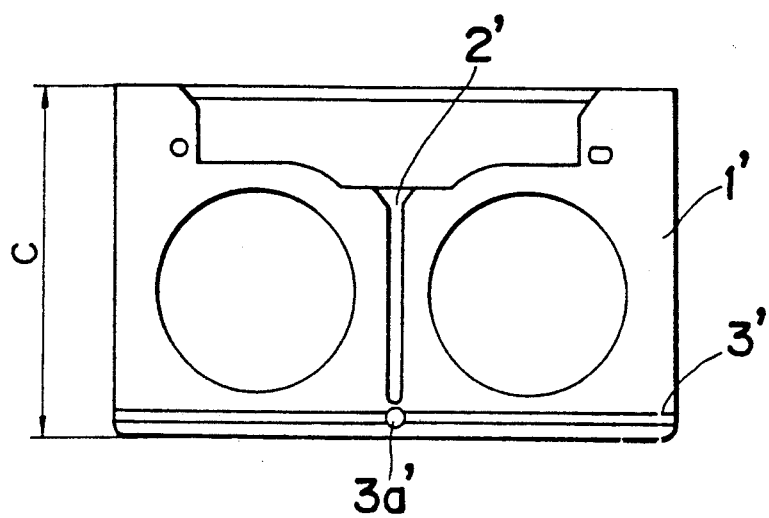
FIG. 2 is a bottom plan view of a conventional small tape cassette.
Figure 3:
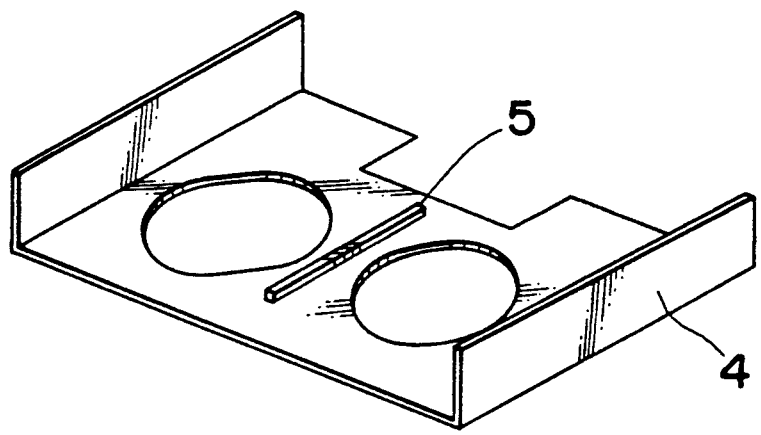
FIG. 3 is a perspective view of a known cassette holder into which the large or small tape cassette in FIGS. 1 or 2 may be loaded.
Figure 4:
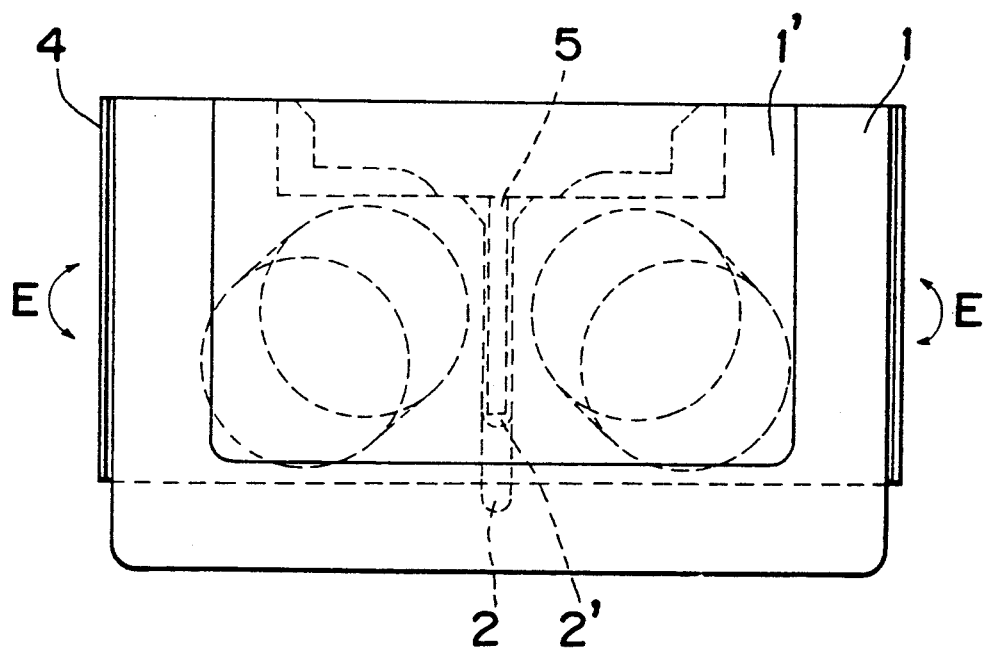
FIG. 4 is a top plan view of the cassette holder in FIG. 3 showing the state in which the known large or small tape cassette of FIGS. 1 or 2 is loaded.
Figure 5:
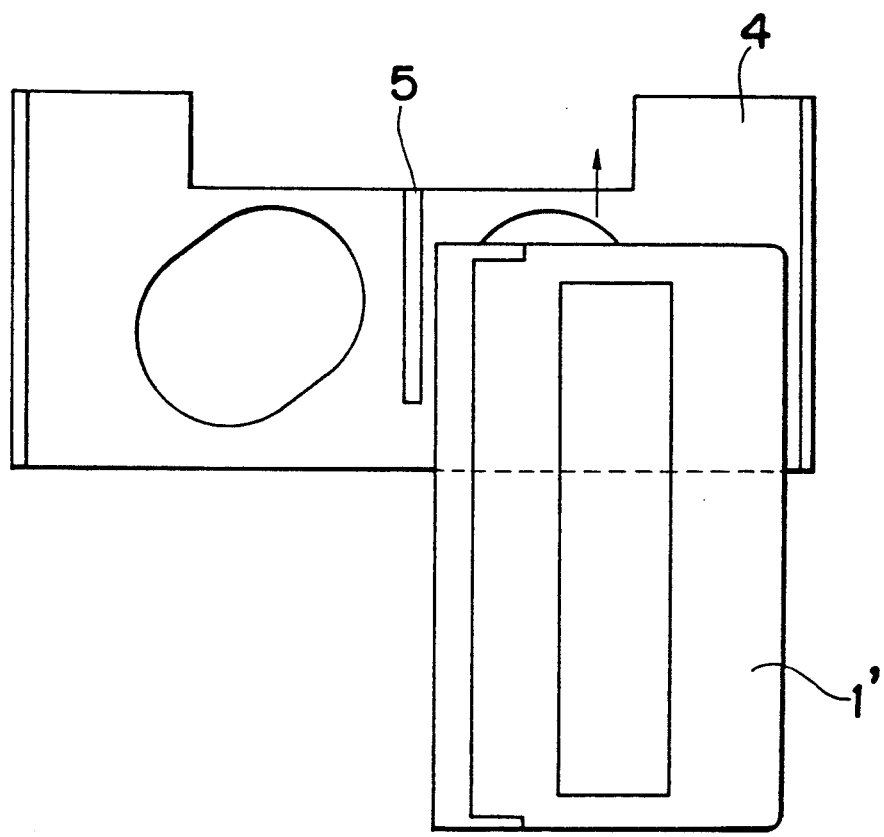
FIG. 5 is a top plan view showing erroneous insertion of the known small tape cassette into the cassette holder.
Figure 6:
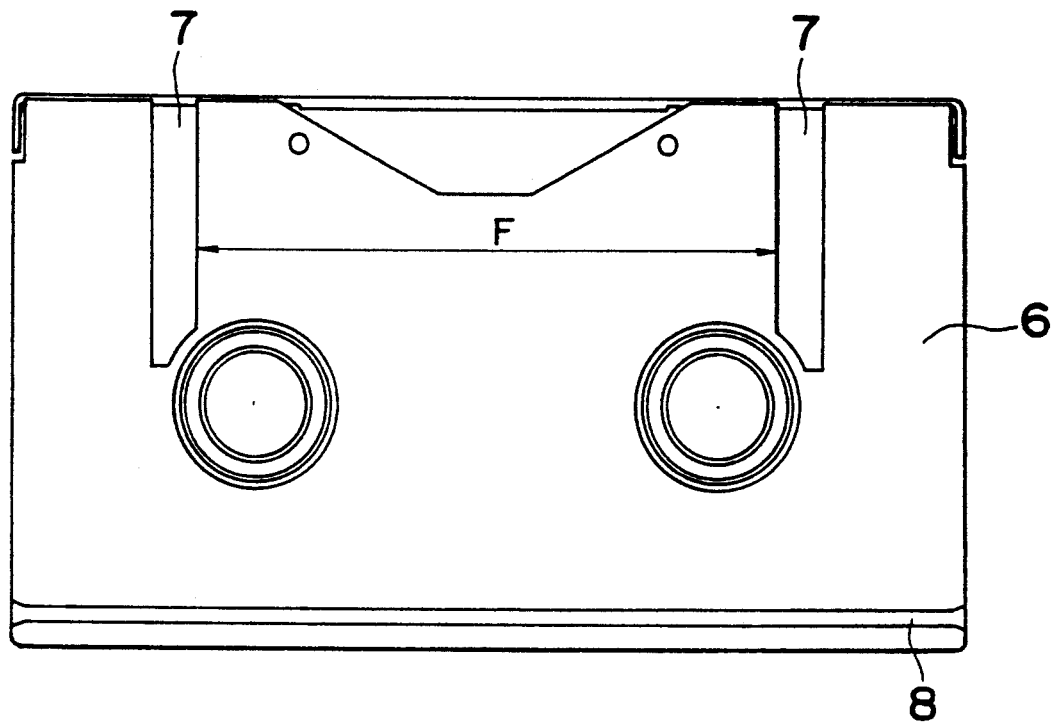
FIG. 6 is a bottom plan view of another conventional large tape cassette.
Figure 7:
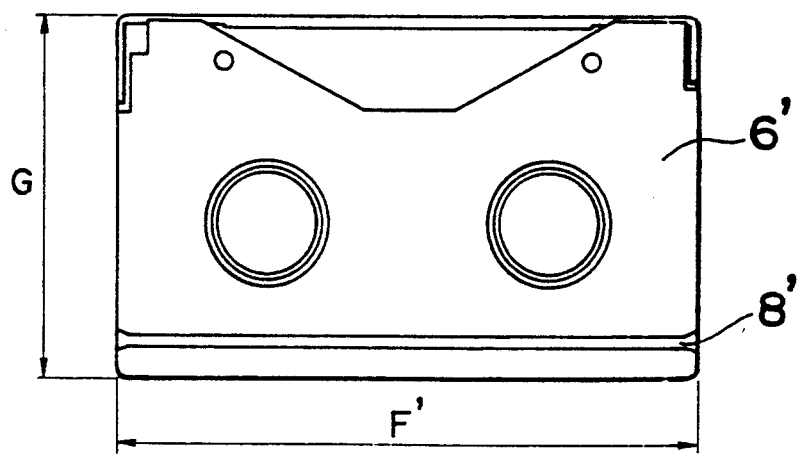
FIG. 7 is also a bottom plan view of another conventional small tape cassette.
Figure 8:
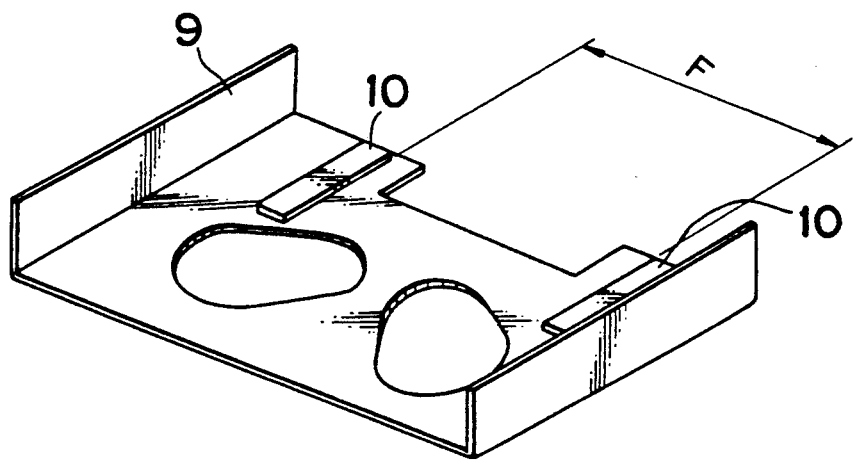
FIG. 8 is a perspective view of another known cassette holder in which the known large or small tape cassette in FIG. 6 or 7 may be loaded.
Figure 9:
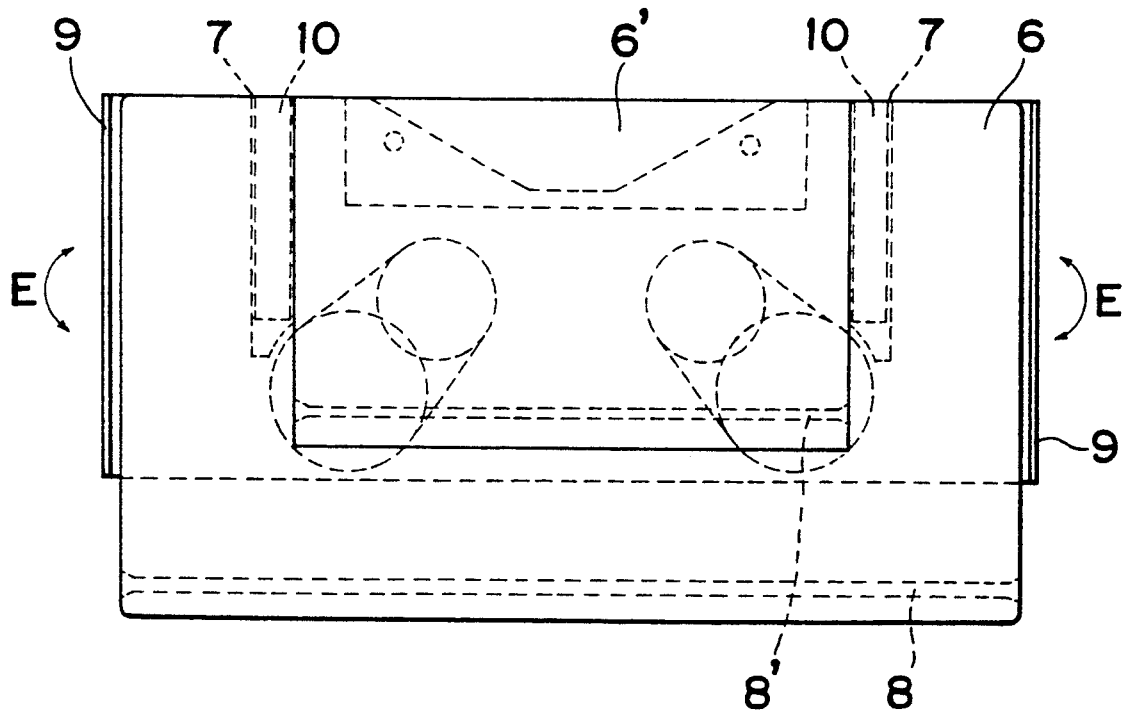
FIG. 9 is a top plan view of the cassette holder in FIG. 8 showing the state in which the known large or small tape cassette in FIG. 6 or 7 is loaded.
Figure 10:
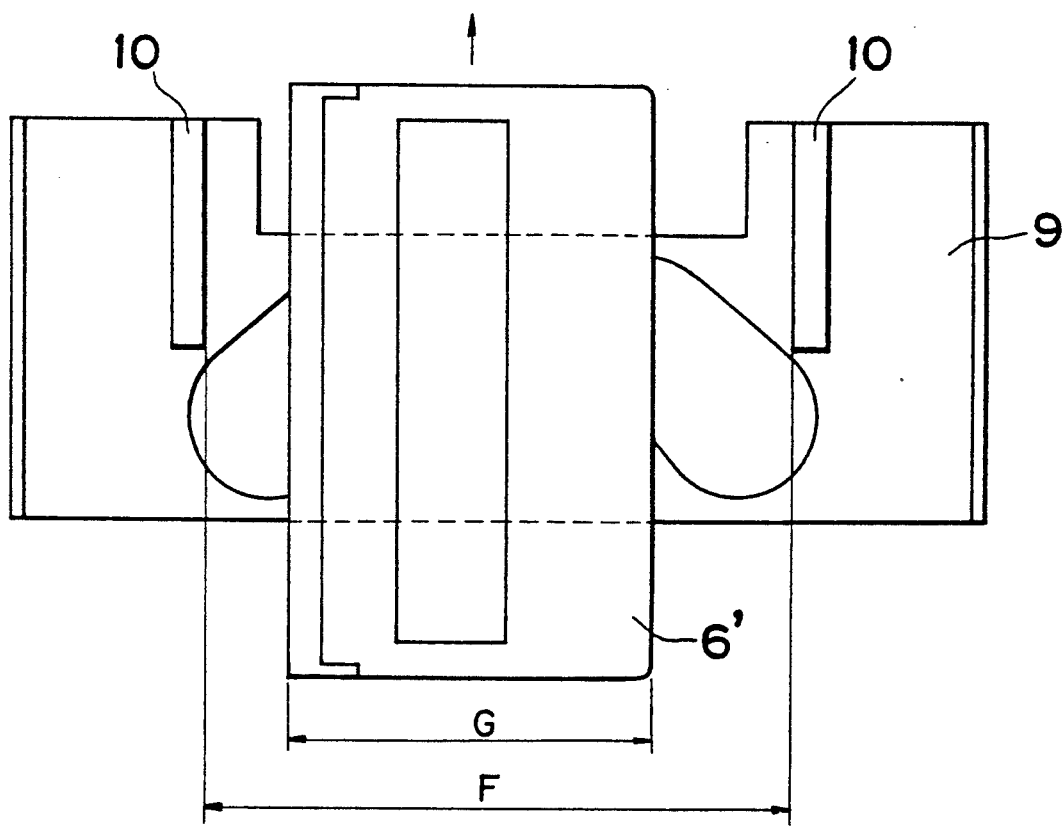
FIG. 10 is a top plan view showing erroneous insertion of the known small tape cassette into the large and small cassette holder of FIG. 8.

Before the description of the present invention proceeds, it is to be noted that like parts are designated by like reference numerals throughout the accompanying drawings.

Referring now to the drawings, the set of tape cassettes including large and small tape cassettes according to one preferred embodiment of the present invention will be described hereinafter.

Figure 11:
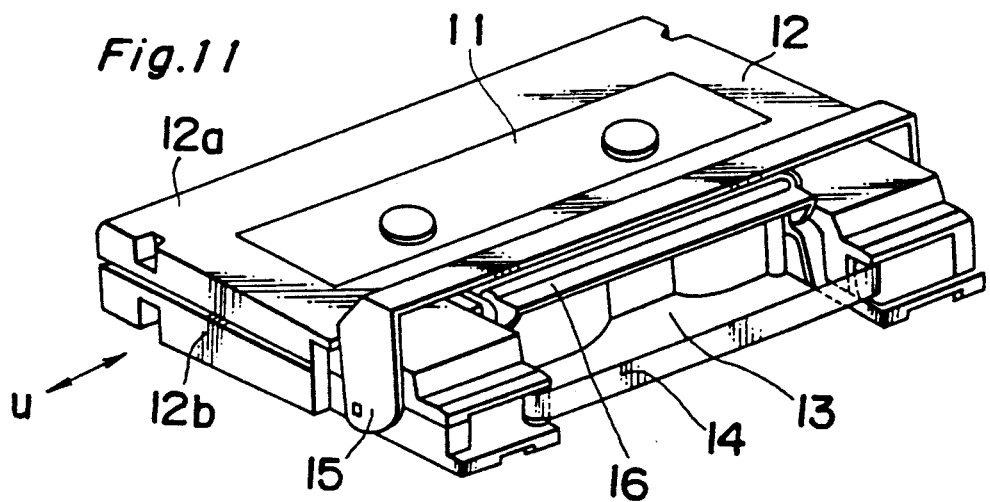
FIG. 11 is a perspective view of a small tape cassette according to one preferred embodiment of the present invention.
Figure 12:
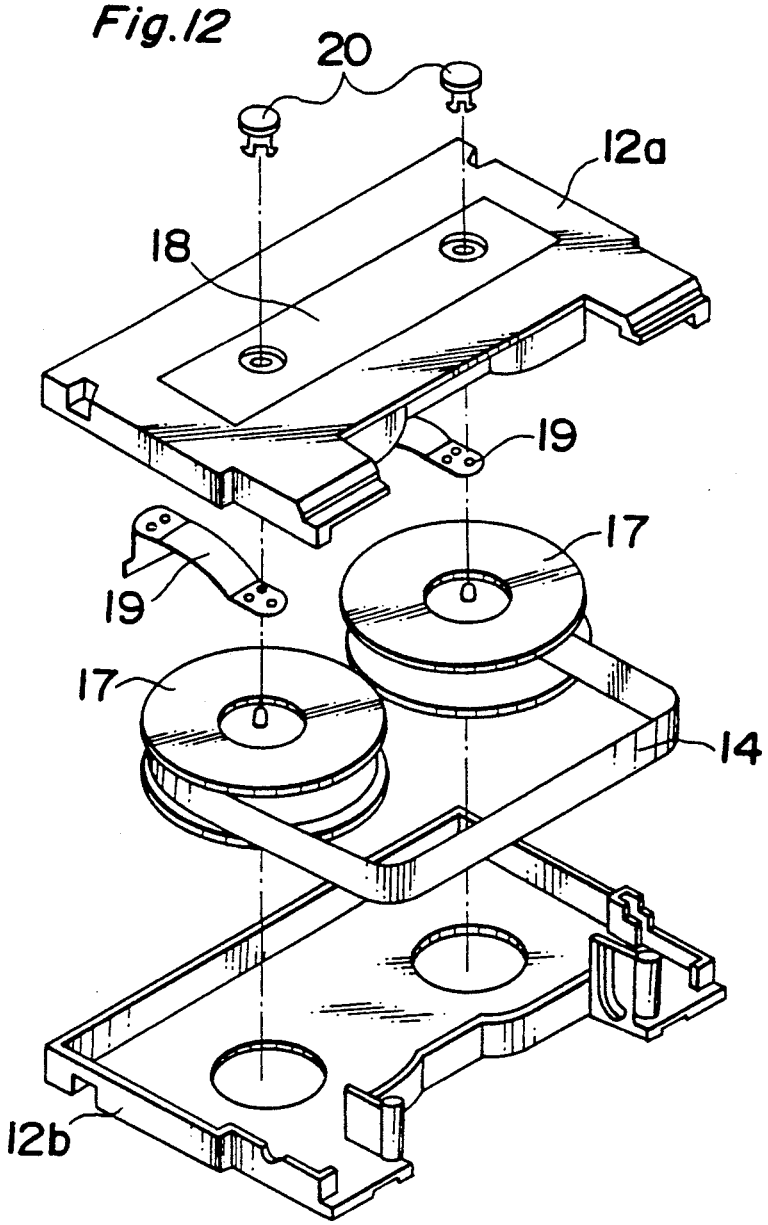
FIG. 12 is an exploded perspective view of the small tape cassette in FIG. 11.

As shown in FIG. 11, the small tape cassette 11 generally includes an upper half portion 12a and a lower half portion 12b molded of a synthetic resin material, and combined wtih each other to constitute a cassette shell housing 12, in which a real means, i.e. a pair of reels 17 wound with the magnetic tape 14 are accommodated (FIG. 12).

At the front face of the cassette shell housing 12, there is provided an elongated opening portion 13 along which the magnetic tape 14 is movably extended, and which is normally covered by a front cover 15 and a rear cover 16 pivotally mounted as described in more detail later.

In the upper half portion 12a, a transparent window 18, e.g. made of a synthetic resin material is formed in order to enable a user to view the amount of the magnetic tape 14 remaining on one or the other of the reels.

On the upper portions of the reels 17, a pair of metallic plate springs 19 for depressing the reels 17 towards the lower half portion 12b and a pair of reel displacing mount reducing members 20 capable of reducing amount of displacement of said reels by an external means are respectively provided.

The arrangement on a bottom face of the small cassette 11 will be described with reference to FIG. 13.

Figure 13:
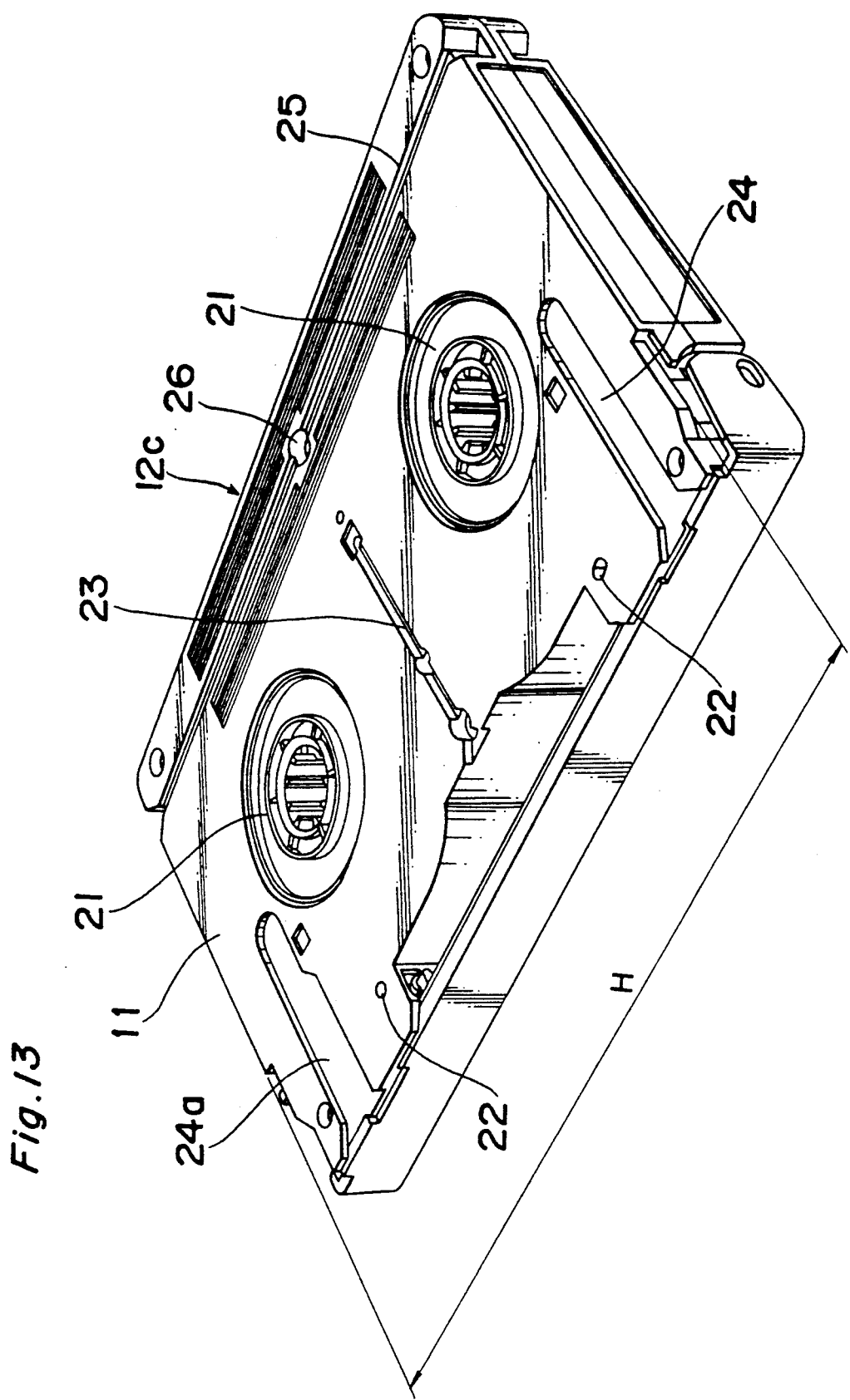
FIG. 13 is a perspective view showing a bottom face of the small tape cassette of FIG. 11.

As shown in FIG. 13, on only the bottom face of the small tape cassette 11 are there formed a pair of reel base insertion holes 21 for receiving a corresponding pair of reel bases (not shown) provided on a related apparatus such as a VTR, and cassette positioning holes 22 to be fitted with cassette positioning pins (not shown) also provided on the related apparatus.

At a central portion along a longitudinal direction of the small tape cassette 11 between opposite sides of the cassette, a cassette guide groove 23 is formed to receive a cassette erroneous insertion preventing protrusion (not shown) provided on a cassette holder of the related apparatus. Moreover, spaced from the left and right sides of said cassette guide groove 23 at the center, a set of cassette guide grooves 24 and 24a are provided for engagement with a corresponding set of cassette guide protrusions (not shown) provided on the cassette holder, with such guide grooves 23, 24, and 24a being positioned in a generally parallel relation to each other. Along and adjacent to a rear face side 12C of the small tape cassette 11 is a direction parallel to the longitudinal direction of said tape cassette, and at right angles to said cassette guide grooves 23, 24 and 24a referred to above, another cassette guide groove 25 is formed to be used when the small tape cassette 11 is inserted in a vertical or longitudinal direction (to be described later). Furthermore, at a central portion in the longitudinal direction of the cassette guide groove 25, a cassette positioning recess 26 of a circular shape is formed for positioning of the small tape cassette within the cassette holder. This cassette positioning recess 26 has a depth larger than that of the cassette guide groove 25.

Figure 14:
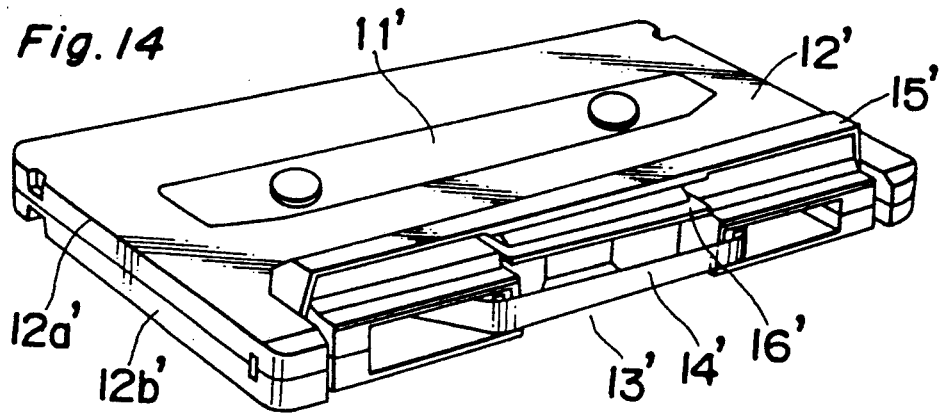
FIG. 14 is a perspective view of a large tape cassette according to one preferred embodiment of the present invention.
Figure 15:
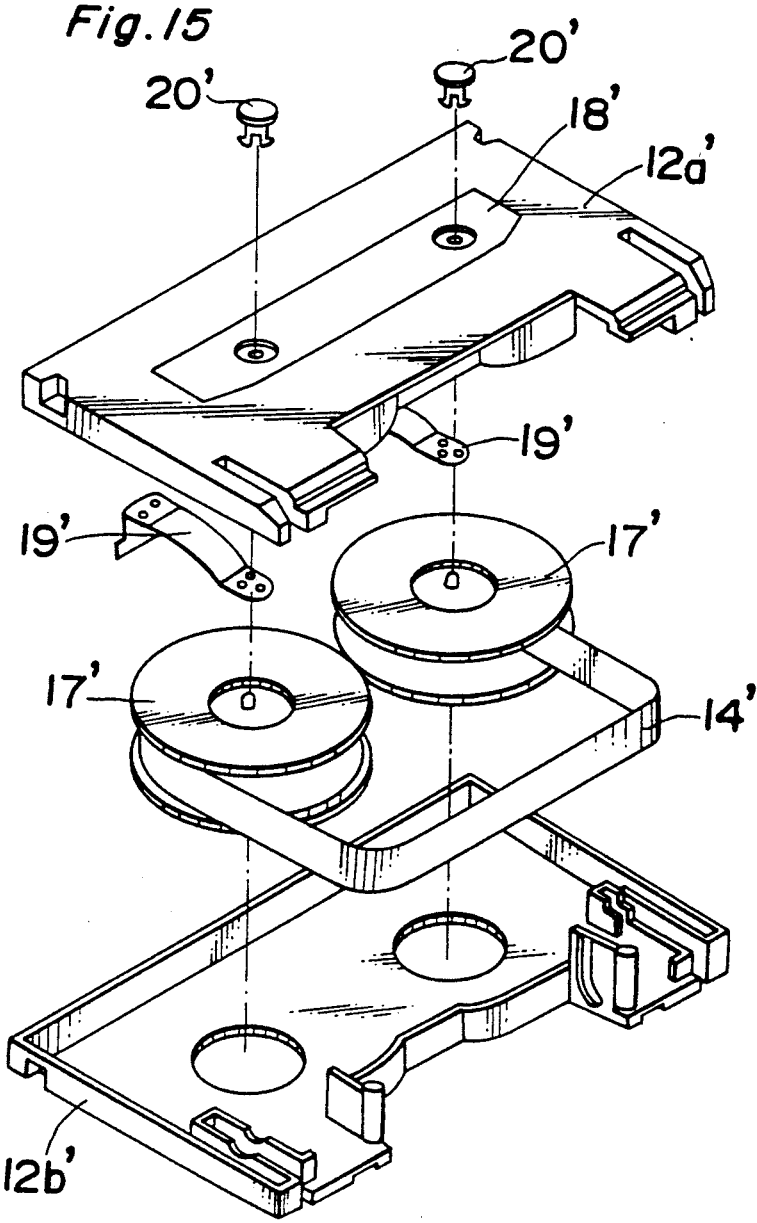
FIG. 15 is an exploded perspective view of the large tape cassette in FIG. 14.

FIGS. 14 and 15 show the construction of the large tape cassette 11'. Since the fundamental structure of the large tape cassette 11' is generally similar to that of the small tape cassette 11 except for provision of further grooves to be described below in FIG. 16. a full detailed description thereof will be omitted here for brevity of explanation, with like parts being designated by like reference numerals affixed with primes.

Figure 16:
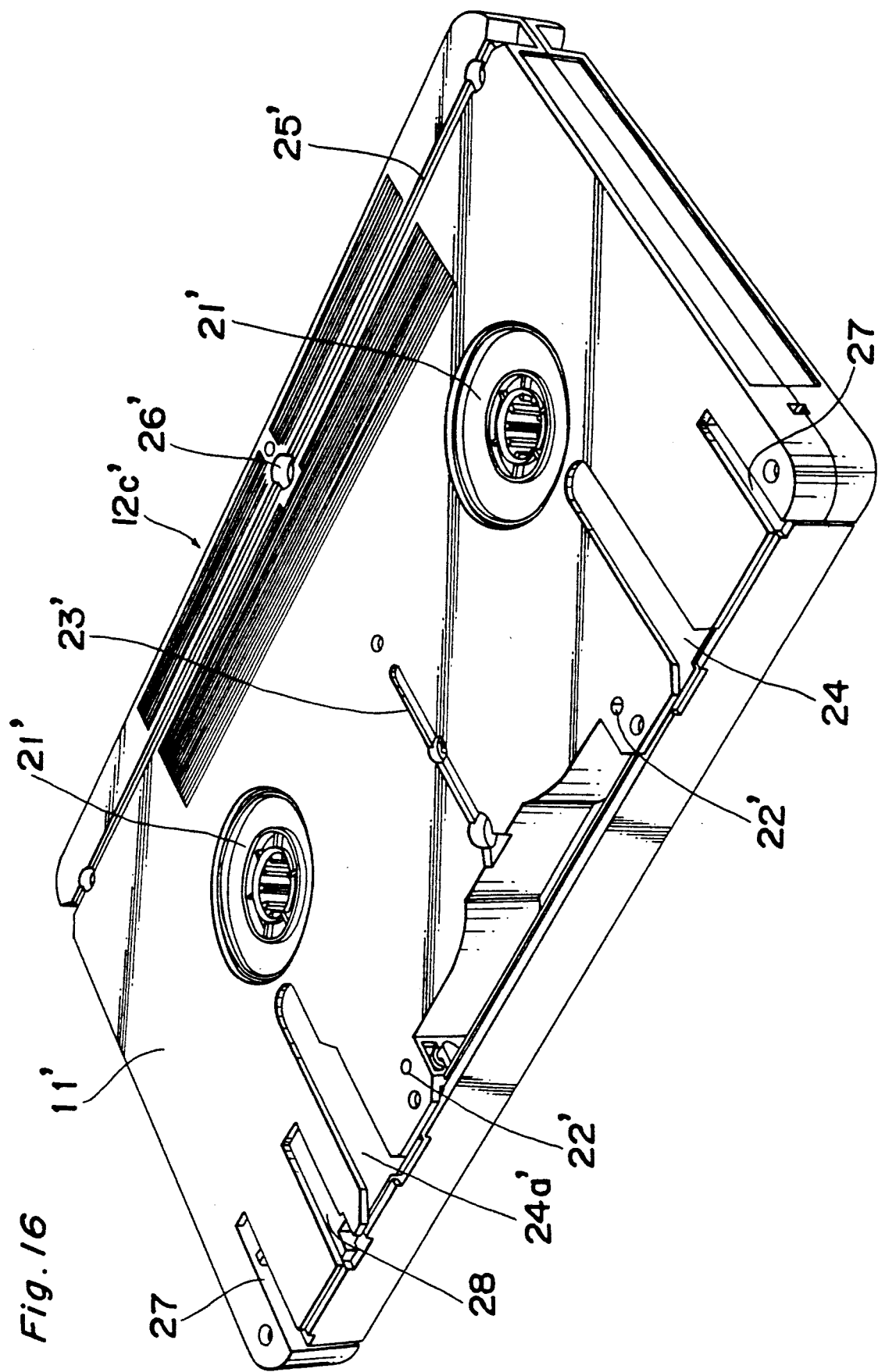
FIG. 16 is a perspective view showing a bottom face of the large tape cassette of FIG. 14.

As shown in FIG. 16, the large tape cassette 11' is further provided, on its bottom surface, with cover member lock release grooves 27 spaced from the outer side of the respective guide grooves 24' and 24a' for receiving cover member lock release members provided on the cassette holder for releasing lock members which lock the front and rear cover members 15'and 16' (FIG. 14) against opening, and a cover member lock release member accommodating groove 28 for accommodating the cover member lock release member for the small tape cassette and provided between the grooves 27 and 24a'.

Referring to FIGS. 17(a) and 17(b), the positional relation of the elements in the bottom face arrangements of the small and large cassettes 11 and 11' will be described.

In FIG. 17(a), the cassette positioning holes 22 and 22' of the small and large tape cassettes 11 and 11' are in a positional relation common to each other. It is to be noted here that FIG. 17(a) shows the state on the bottom faces where the positioning holes 22 and 22' of the small and large tape cassettes 11 and 11' are in the same positions as each other, and with the cassette positioning holes 22 and 22' being set as reference points, the cassette guide grooves 23 and 23', the set of cassette guide grooves 24, 24', 24a and 24a', and also the opening portions 13 and 13' of the small and large tape cassette are also in positional relations common to each other.

The grooves are so arranged that, when a distance between the cassette guide groove 23 or 23' of the small or large tape cassette 11 or 11' and the set of the left or right cassette guide groove 24, 24', 24a or 24a' is represented by I, the depth of the small tape cassette is denoted by J, and a distance from the cassette guide groove 24' or 24a' to the side face of the large tape cassette 11' is shown by K as illustrated in FIG. 17(a), the relation of these dimensions is $J > K, I$.

Since the set of the cassette guide grooves 24, 24', 24a and 24a' are intended to place the small and large tape cassettes 11 and 11' in stable positional relation at the predetermined position within the cassette holder, they resemble the cassette guide groove arrangement referred to earlier in the conventional example I if a length L between grooves 24 or 24 is short, and thus, it becomes necessary to provide a certain predetermined distance therebetween. Therefore, according to the present embodiment, said guide grooves 24 and 24a or 24' and 24a' are positioned at opposite sides of the opening portion 13 or 13' of the small and large tape cassette 11 or 11'. Additionally, it is preferable that the length M of each of the set of cassette guide grooves 24, 24', 24a and 24a' be on the longer side, and if it is longer than the length W of the opening portion 13 or 13', the positional restriction can be stably effected.

Furthermore, at the entrance openings of the set of cassette guide grooves 24, 24', 24a and 24a', there are provided inclined faces 29 and 29'. In the cassette guide groove 24a or 24a' on one side, the groove width at the entrance opening is represented by N, and at the inner end portion is denoted by O, and the relation is $N > O$. It is to be noted that the width of the guide groove 24 or 24' at the other side is equal to O along the entire length of said groove.

The cassette guide grooves 25 and 25' for inserting the small and large tape cassettes 11 and 11' in the longitudinal direction are formed at the same distance P from the rear face sides 12c (12c') of the respective tape cassettes.

Similarly, the width Q and depth R of the cassette guide grooves 25 and 25' of the small and large tape cassettes 11 and 11', and the shape of the cassette positioning recesses 26 and 26' located at the central portions of said cassette guide grooves are also set to be generally equal to each other.

It is to be noted that the depth V of the cassette positioning recesses 26 or 26' is larger than the depth R of the cassette guide groove 25 or 25'.

The construction of the small and large tape cassettes 11 and 11' according to the present invention are as described so far.

Hereinafter, the construction of a cassette holder for receiving the small and large tape cassettes 11 and 11' in the lateral direction as described above will be described.

Figure 18:
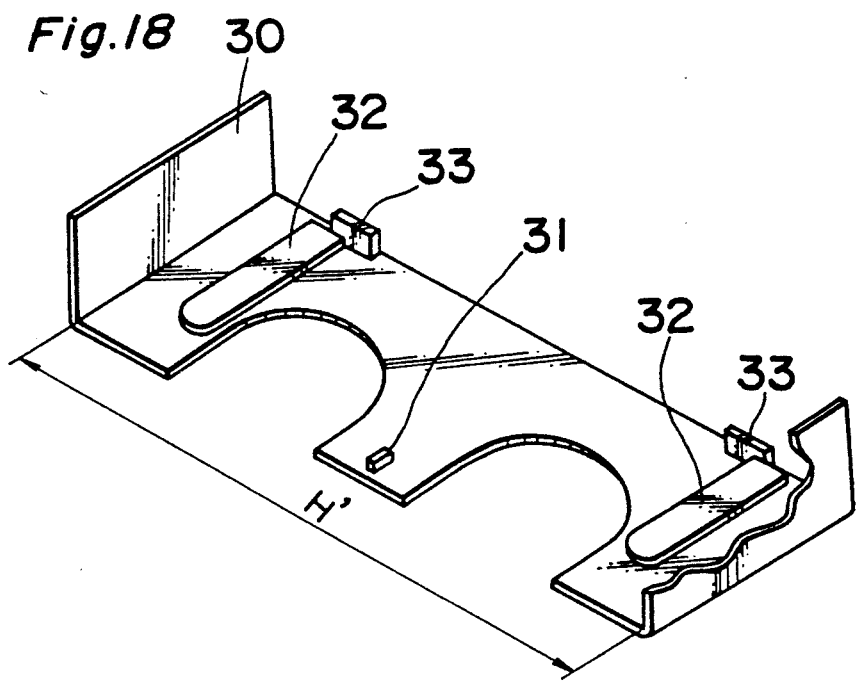
FIG. 18 is a perspective view showing the construction of a cassette holder for the small tape cassette according to the present invention.

As shown in FIG. 18, the cassette holder 30 for the small tape cassette 11 has a front width H' generally equal to the longitudinal length H of said small tape cassette, and is provided, on its upper face, with a cassette erroneous inserting preventing projection 31 formed at a central portion, and a set of cassette guide protrusions 32 corresponding in dimensions to the set of cassette guide grooves 24 and 24a of the small tape cassette 11 and provided on opposite sides of and spaced from said protrustion 31 as shown. Moreover, each of the cassette guide protrusions 32 is provided, at its rearward end portion, with a cassette front face positioning projection 33.

Figure 19:
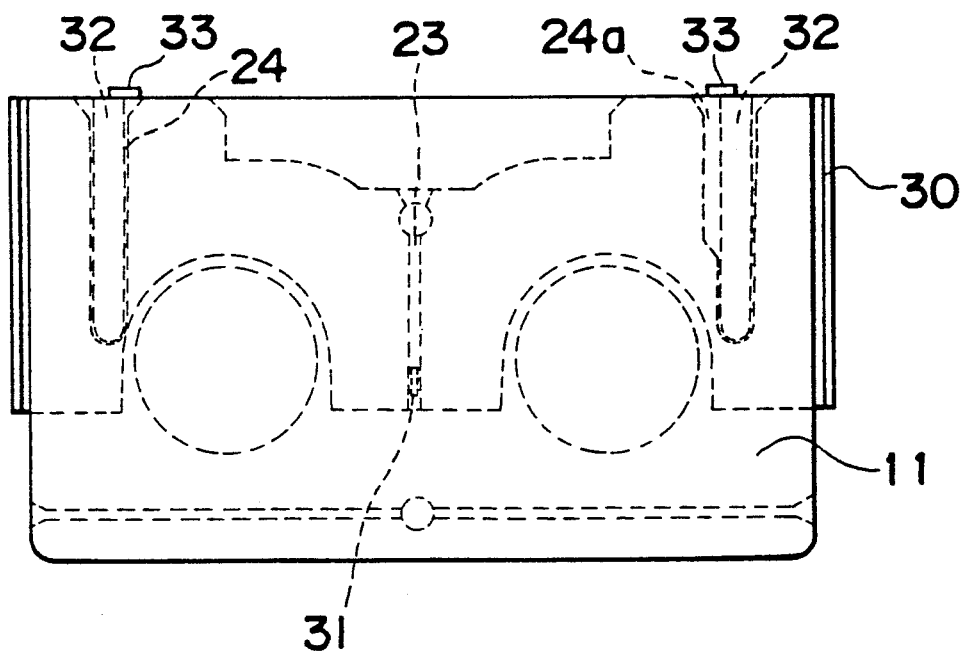
FIG. 19 is a top plan view showing the state in which the small tape cassette is loaded on the cassette holder of FIG. 18.

When the small tape cassette 11 according to the present invention is inserted into the cassette holder 30 as described above, the set of cassette guide protrusions 32 respectively engage the set of the cassette guide grooves 24 and 24a to guide the small tape cassette 11 to the predetermined positions, as shown in FIG. 19, and when the front face of the cassette 11 contacts the front face positioning projections 13, positioning in the cassette holder 30 is completed. In the above state, the cassette erroneous insertion preventing projection 311 has entered the cassette guide groove 23 at the central portion of the small tape cassette 11. Thereafter, the cassette holder 30 is moved, and the small tape cassette 11 is positioned in a state capable of effecting recording or reproducing.

Figure 20:
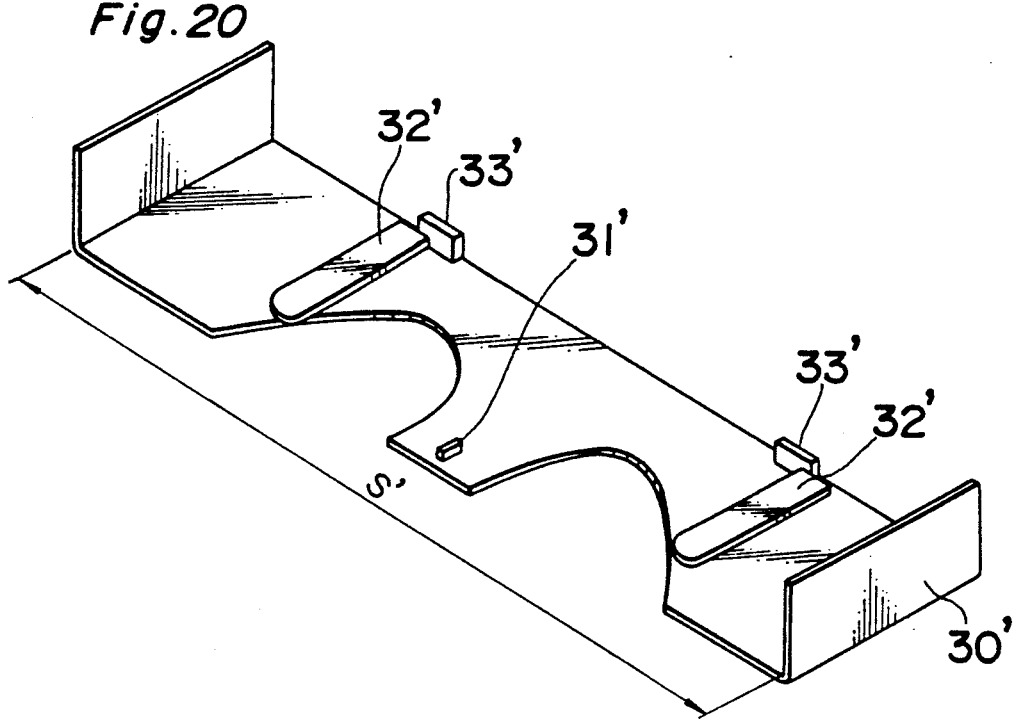
FIG. 20 is a perspective view showing construction of a cassette holder for either of the large and small tape cassettes according to the present invention.
Figure 21:
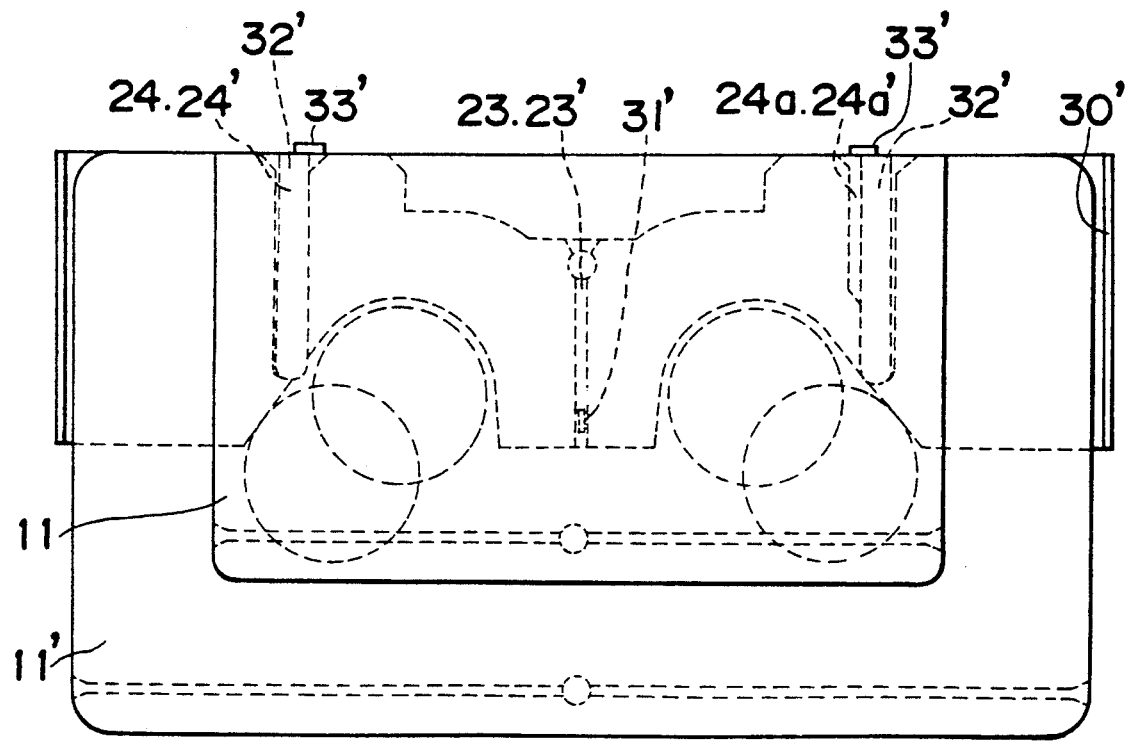
FIG. 21 is a top plan view showing the state in which the large or small tape cassette is loaded into the cassette holder of FIG. 20.

The construction of a cassette holder 30' for receiving both the small and large tape cassettes 11 and 11' in the lateral direction will be described (FIG. 20).

Since the fundamental structure of the large tape cassette holder 30' is generally the same as that of the small tape cassette holder 30 referred to above, a full detailed description thereof is omitted here for brevity of explanation, with like parts being designated by like reference numerals affixed with primes.

As shown in FIG. 20, the cassette holder 30' for the small and large tape cassettes 11 and 11' has a front width S' generally equal to the longitudinal length S of said large tape cassette 11', and is provided, on its upper face, with a cassette erroneous insertion preventing projection 31' formed at a central portion, and a set of cassette guide protrusions 32' corresponding in dimensions to the set of cassette guide grooves and provided at opposite sides of and spaced from said protrusion 31', in similar positional relation as in the small tape cassette holder 30 in FIG. 18, with each of the cassette guide protrusions 32' having, at its rear end portion, a cassette front face positioning projection 33'.

When the large tape cassette 11' according to the present invention is inserted into the small and large cassette holder 30 as described above, it is loaded by similar procedures as for the small tape cassette 11 described earlier.

On the other hand, when the small tape cassette 11 according to the present invention is inserted into the small and large cassette holder 30' having a wide front portion, the set of cassette guide protrusions 32' respectively engage the set of the cassette guide grooves 24 and 24a of the small tape cassette to guide said tape cassette 11 to the predetermined position for positional restriction thereof.

In the above case, the cassette erroneous insertion preventing projection 31' has similarly entered the cassette guide groove 23.

By the arrangement according to the present invention as described so far, since the positioning through combination of the respective tape cassettes and the respective cassette holders is effected by the position of cassette guide grooves 24, 24', 24a and 24a', while the width N of the entrance opening of the groove on one side is larger than the remainder of the length of the groove, there is available an effect that the engagement with respect to the cassette guide protrusionss 32 and 32' is facilitated.

Figure 22:
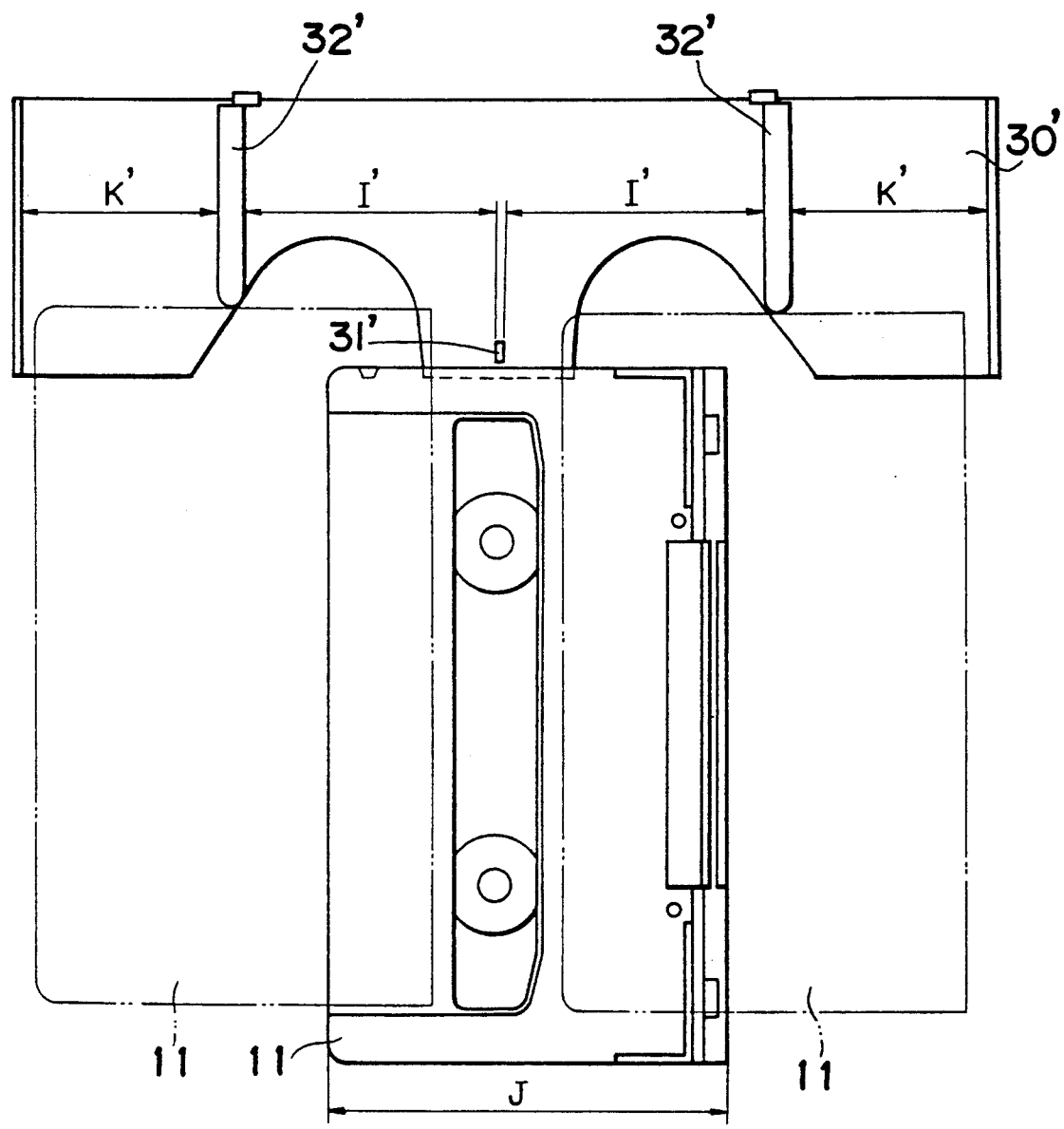
FIG. 22 is a top plan view of the cassette holder for the large and small tape cassettes for explaining its erroneous insertion preventing effect.

Additionally, as shown in FIG. 22, even when the small tape cassette 11 is erroneously inserted with one side forward into the small and large tape cassette holder 30', since the distance I' between the cassette erroneous insertion prevention projection 31' and the cassette guide protrusions 32' located on the opposite side of the projection 31', and the distance K' between the cassette guide protrusions 32' and the respective side faces of the cassette holder 30' is smaller than the depth J of the small tape cassette 11, said small tape cassette 11 is brought into contact with the cassette erroneous insertion preventing projection 31' or the cassette guide protrusion 32' even if said small tape cassette 11 is inserted side face forward from any position, thereby being prevented from entry into the apparatus.

Accordingly, the serious problem related to the breakage of the apparatus taking place in the conventional examples 1 and 2 can be advantageously prevented.

So far, although the prevention of erroneous insertion in the direction of u of the small tape cassette shown in FIG. 11 has been mainly described, erroneous insertion with faces other than the normal inserting faces forward, such as erroneous insertion with the rear face forward or with the front face forward but with the cassette upside down, of the small and large tape cassettes 11 or 11' can also be prevented by the arrangement of the present invention.

Furthermore, as shown in FIG. 17, although the cassette guide groove 23 or 23' is provided at the central portion of the tape cassette 11 or 11', since the reels are not located within such central portion of the cassette shell housing, the thickness of the lower half 12b of the cassette shell housing can be readily increased, and therefore, the grooves are easily formed and may be extended to the rear face 12c and 12c' of the tape cassette.

Consequently, if the cassette guide groove 23 or 23' is extended to the rear face 12c or 12c' of the tape cassette beyond the set of the cassette guide grooves 24, 24', 24a or 24a', the projection 31' can be placed closer to the front opening of the holder, and the following effects can be obtained.

In short, by the above construction, as shown in FIG. 20, the cassette erroneous insertion preventing projection 31' of the cassette holder 30' can be provided in the vicinity of the cassette insertion opening (forward side). As a result, upon erroneous insertion of the tape cassette 11 or 11', erroneous insertion can be detected when the tape cassette has just entered the cassette holder 30'.

Figure 23A:
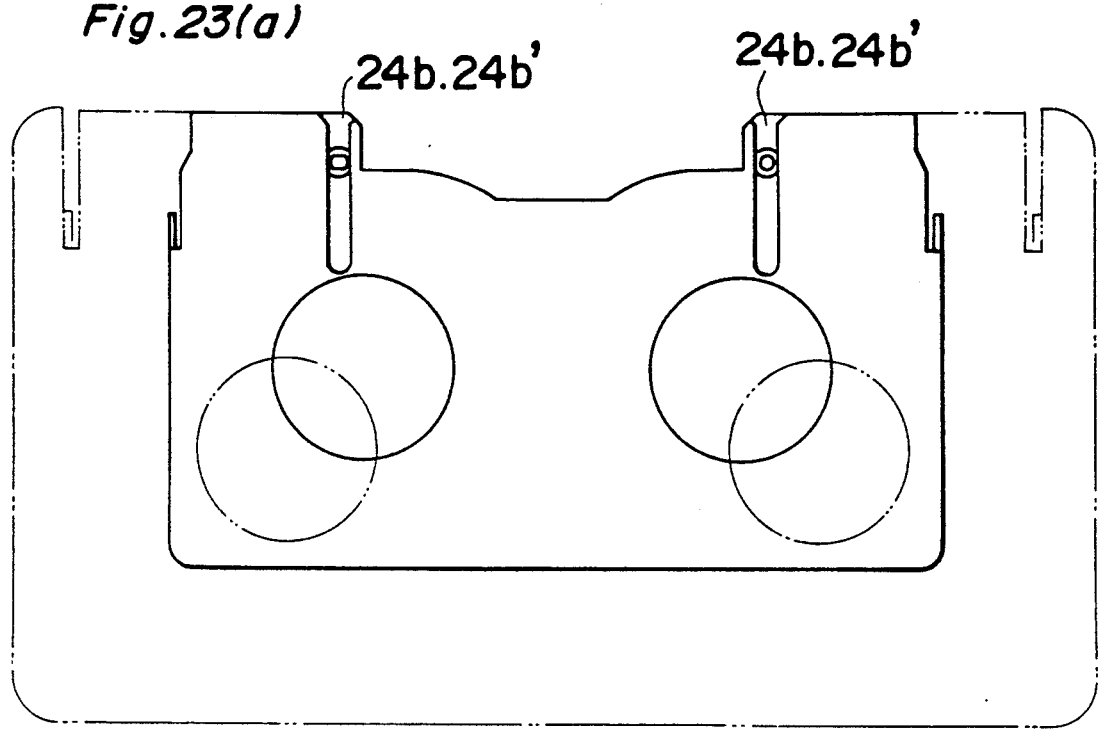
FIGS. 23(a) and 23(b) are top plan views similar to FIG. 17(a), which particularly show modifications thereof in which the number of cassette guide grooves is altered.
Figure 23B:
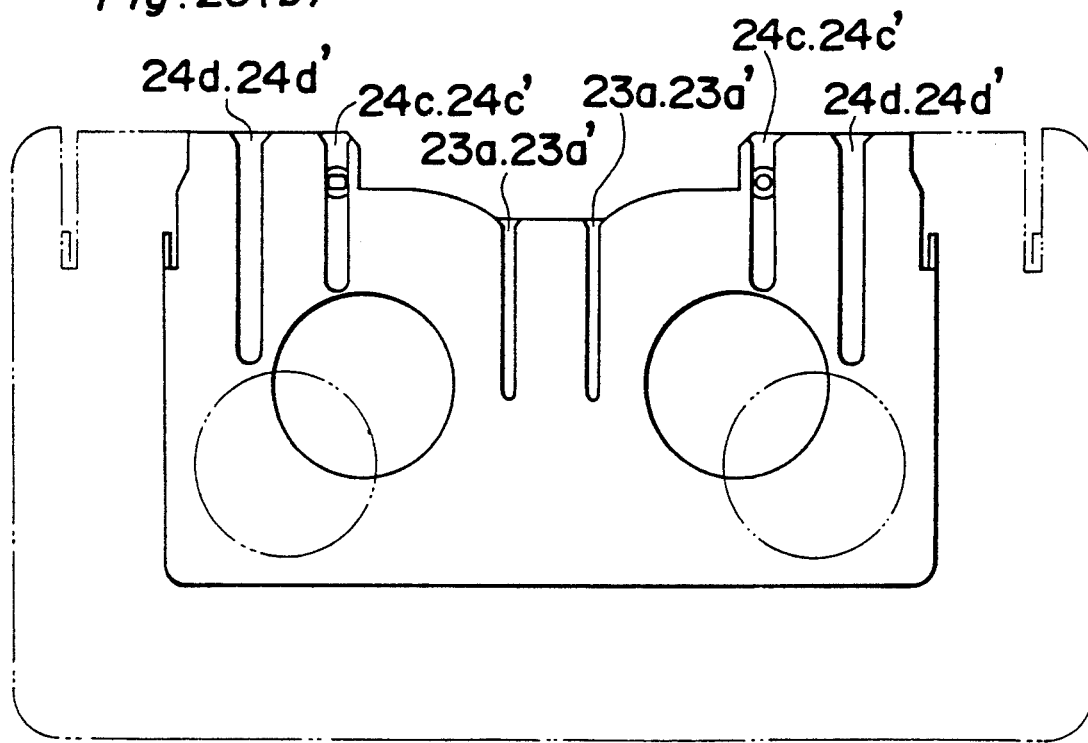

It should be noted here that, in the foregoing embodiment, although the description has been given with respect to the three cassette guide grooves 24, 24', 24a, 24a', 23 and 23', the concept of the present invention is not limited in its application to the above, but may be modified, for example, to provide only two cassette guide grooves 24b and 24b' as shown in FIG. 23(a) or to a plurality of cassette guide grooves 23a, 23a', 24c, 24c', 24d and 24d' as shown in FIG. 23(b) to obtain an effect similar to that referred to earlier.

Subsequently, another small and large tape cassette holder 34 arranged to permit insertion of the small and large tape cassette 11 or 11' in the longitudinal direction will be explained with reference to FIG. 24.

Figure 24A:
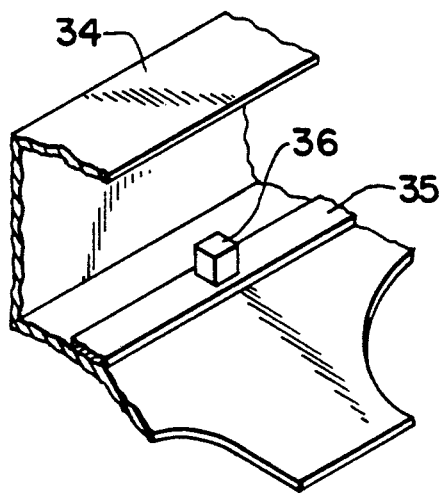
FIG. 24(a) is a fragmentary view similar to FIG. 24 showing a modified form of cassette position projection.
Figure 24:
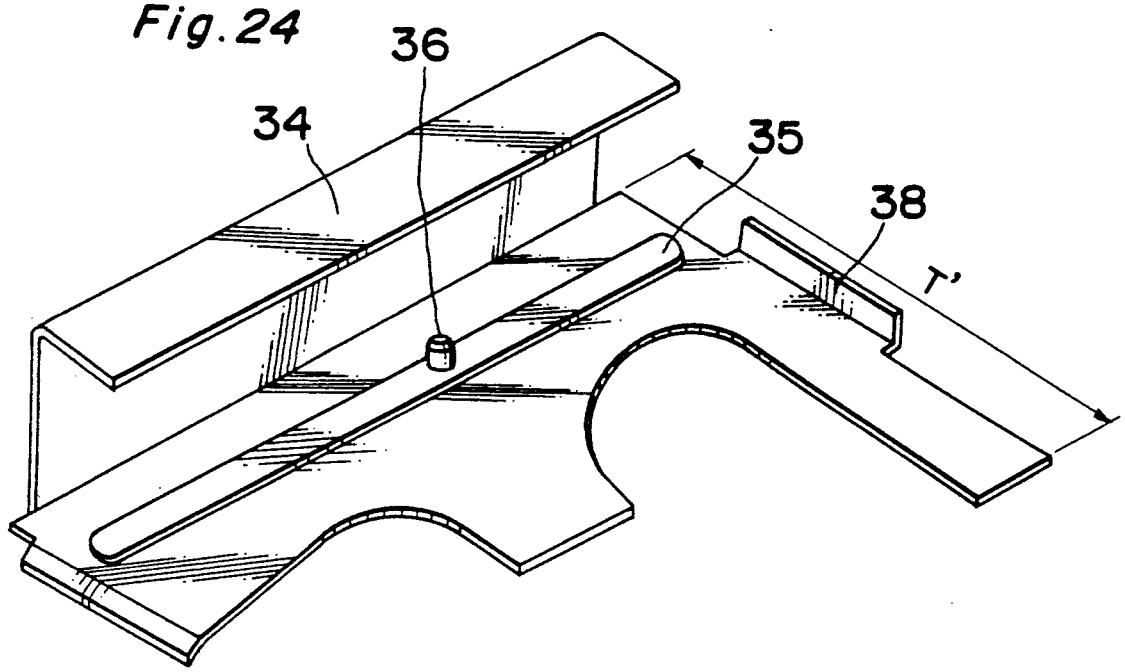
FIG. 24 is a perspective view of another cassette holder for the large and small tape cassettes, arranged to permit insertion of the large or small tape cassette in a longitudinal direction.

As shown in FIG. 24, the width T' of the cassette holder 34 is set to be generally equal to the depth T (FIG. 17(a)) of the large tape cassette 11'.

Adjacent to the side face of the cassette holder 34, a cassette guide protrusion 35 is provided for engagement with the cassette guide groove 25 or 25' of the small or large tape cassette 11 or 11' to guide said tape cassette, and on said cassette guide protrusion 35, a cassette positioning projection 36 is provided for engagement with the cassette positioning recess 26 or 26' of the small or large tape cassette 11 or 11'.

Figure 25:
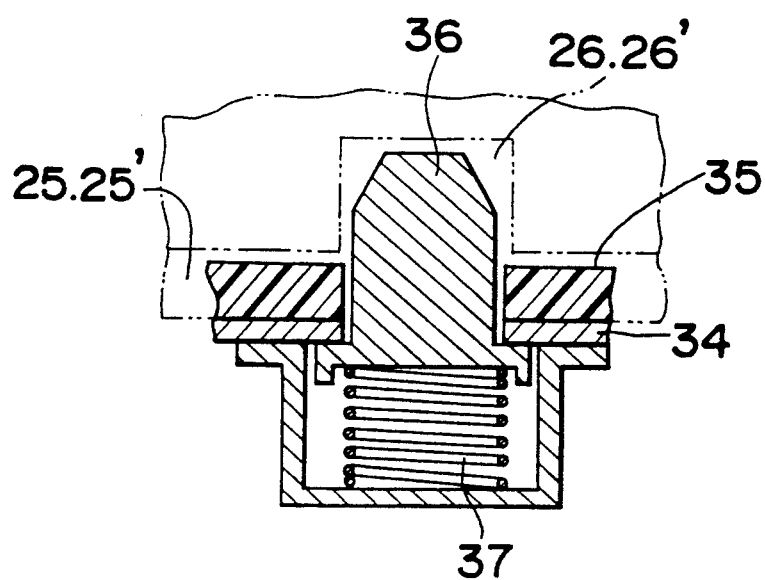
FIG. 25 is a cross section showing, on an enlarged scale, a cassette positioning projection provided in the cassette holder of FIG. 24.
Figure 26:
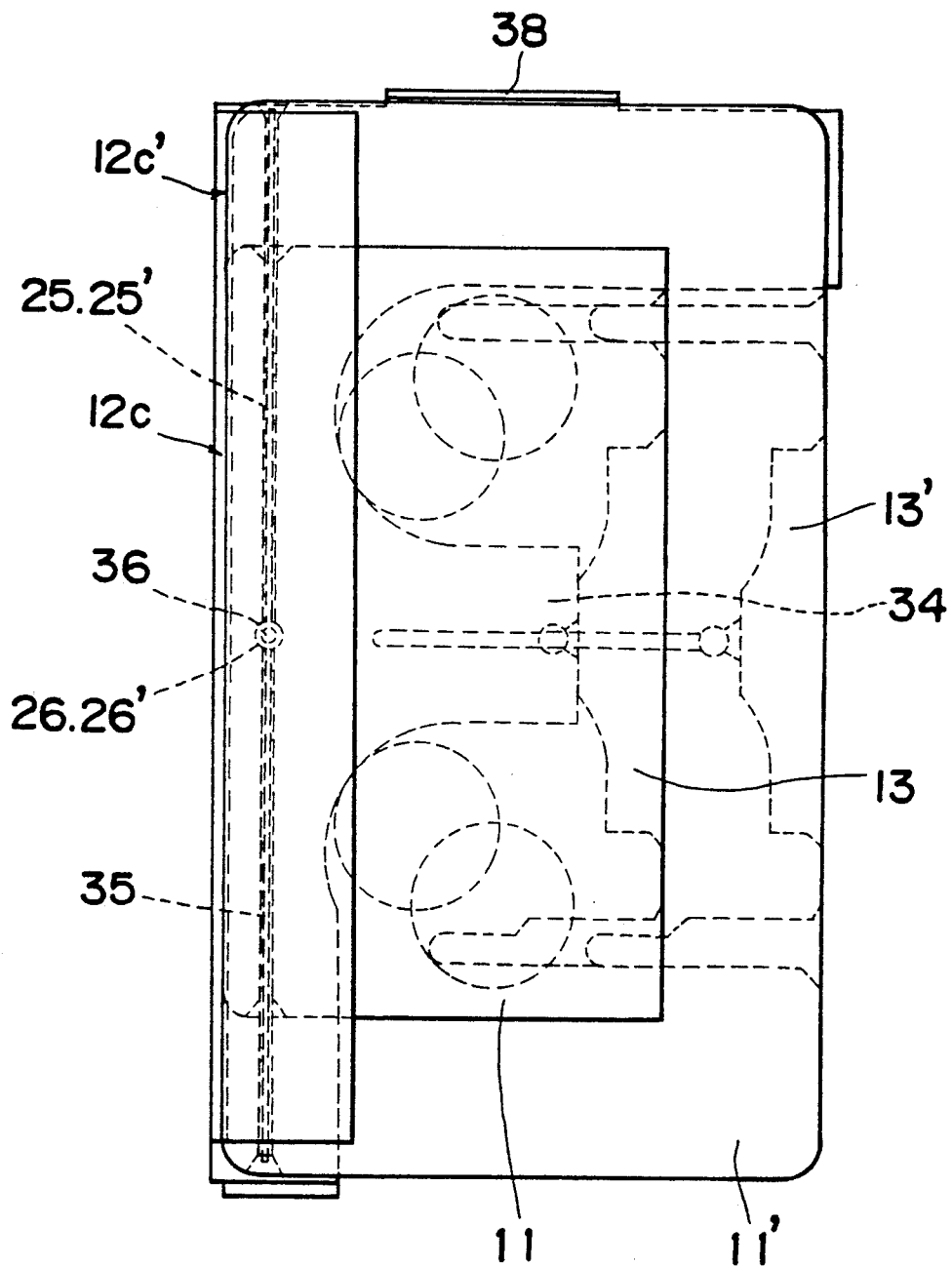
FIG. 26 is a top plan view of the cassette holder of FIG. 24 showing the state in which the large or small tape cassette is inserted.

As shown in FIG. 25 representing a cross section in the vicinity of the cassette positioning projection 36 on an enlarged scale, said projection 36 is resiliently urged by a coil spring 37 so as to project upwardly from the surface of the cassette holder 34.

The cassette holder 34 is further provided, at one edge portion thereof, with cassette side face positioning projection 38 as shown in FIG. 24.

When the large tape cassette 11' is inserted into the cassette holder 34 as described so far, the cassette guide protrusion 35 of said cassette holder 34 engages the cassette guide groove 25' of the large tape cassette 11' so as to guide said tape cassette to the predetermined position, and upon contact of the side face of said tape cassette 11' with the cassette side face positioning projection 38, positioning of the large tape cassette 11' within the cassette holder 34 is completed. In this case, the cassette positioning projection 36 is brought into the state where it has been engaged in the cassette positioning recess 26'. Thereafter, the cassette holder 34 is displaced, whereby the large tape cassette 11' is ready for recording or reproducing.

Upon insertion of the small tape cassette 11 into the cassette holder 34, the cassette guide protrusion 35 is fitted into the cassette guide groove 25 of the small tape cassette 11 for guiding. When the small tape cassette 11 is further inserted, and the cassette positioning recess 26 of the tape cassette 11 is located above the cassette positioning projection 36 of the cassette holder 34, the projection 36 engages the recess 26, whereby the small tape cassette 11 is positioned part way into the cassette holder 34. In other words, in the above state, the side face of the small tape cassette 11 is spaced from the cassette side face positioning projection 38, and as compared with the state where the large tape cassette 11' is loaded, said small tape cassette 11 is positioned at the central portion of the cassette holder 34. By this arrangement, since the front opening portion 13 or 13' of the tape cassettee 11 or 11' which receives members of the related apparatus is located at the central portion of the tape cassette 11 or 11', design and manufacture of the mechanism at the side of the related mechanism are comparatively facilitated.

In the arrangement described above, since the cassette positioning recess 26 or 26' of the small or large tape cassette 11 or 11' is located at a common position spaced from the cassette rear face 12c or 12c', the positioning of the small or large cassette can be commonly effected by the provision of one cassette positioning projection 36 at the side of the cassette holder 34.

Moreover, since the cassette positioning recesses 26 and 26' are located on the cassette guide grooves 25 and 25', positioning of the tape cassettes can be effected stably and positively.

Figure 17C:
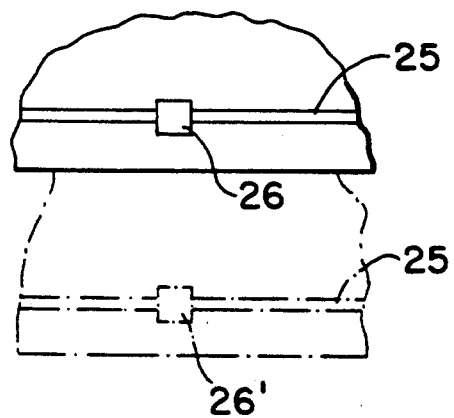
FIG. 17(c) is a fragmentary view similar to FIG. 17(a) showing a modified form of cassette positioning recess.

It is to be noted here that in the foregoing embodiments, although the shapes of the cassette positioning recesses 26 and 26' and cassette positioning projections 36 are described as being circular, such shapes need not necessarily be circular, but may be modified into a polygonal shape such as a square shape or the like as shown in FIGS. 17(c) and 24(a), depending on requirements.

It should also be noted that if the cassette positioning recess 26 or 26' is commonly utilized with a fastening screw recess for a screw for clamping the upper and lower halves of tape cassette 11 or 11', the screw assembly work during assembly of each tape cassette can be simplified.

Figure 27:
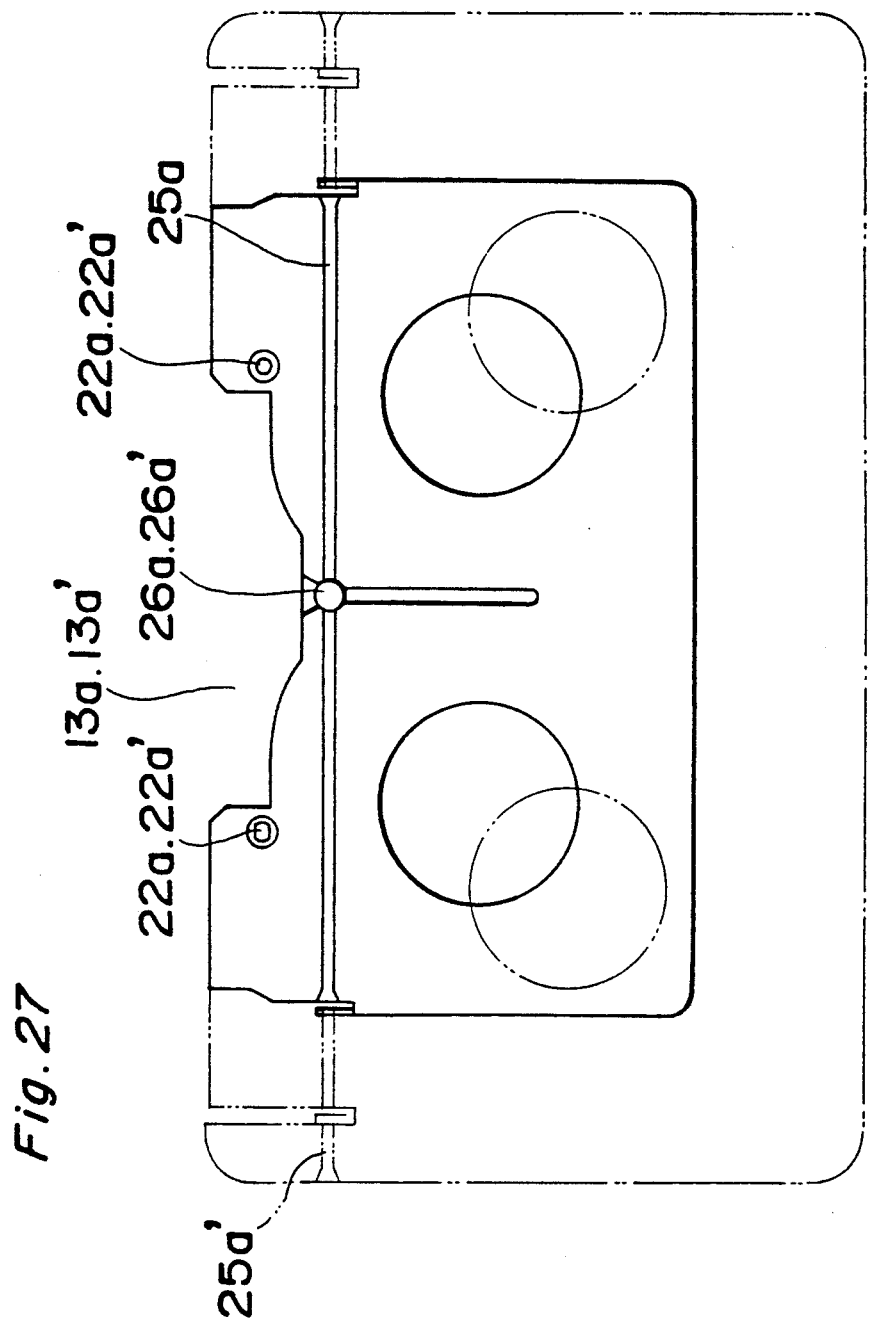
FIG. 27 is a view similar to FIG. 26, which particularly shows a further modification thereof.

It should further be noted that in the foregoing embodiment, although the cassette positioning recess 26 or 26' and the cassette guide grooves 25 or 25' are described as being provided at the same distance from the rear face 12c of the cassette, the arrangement may be, for example, so modified as shown in FIG. 27 in which a cassette positioning recess 26a or 26a' and a cassette guide groove 25a or 25a' are provided at the same distance from the cassette positioning holes 22a and 22a' at the side close to the opening portion 13a or 13a' of the tape cassette.

As is clear from the foregoing description, according to the small and large tape cassettes of the present invention, it becomes possible, during insertion thereof into the cassette holder, to selectively insert the tape cassettes in the lateral or vertical direction, while positioning of the tape cassettes within the cassette holder can be readily and stably effected, and erroneous insertion of the tape cassettes at respective directions can be advantageously prevented.

In the foregoing embodiments, although the tape cassette means according to the present invention has been described with respect to the two kinds, i.e. small and large tape cassettes 11 and 11', the concept of the present invention is not limited in its application to two such kinds of tape cassettes alone, but may be readily applied to tape cassettes of more than three kinds having different sizes as well.

Thus, according to the present invention, remarkable effects as listed below can be achieved.

(1) In the cassette holder capable of loading small and large tape cassettes in the lateral direction, erroneous insertion of the respective tape cassettes can be prevented.

(2) In the cassette holder capable of loading respective tape cassettes in the lateral direction, positioning of the tape cassettes within the cassette holder can be readily and stably effected.

(3) In the cassette holder capable of loading respective tape cassettes in the longitudinal direction, positioning of each tape cassette within the cassette holder can be effected by the common positioning projection.

Although the present invention has been fully described by way of example with reference to the accompanying drawings, it is to be noted that various changes and modifications will be apparent to those skilled in the art. Therefore, unless such changes and modifications depart from the scope of the present invention, they should be construed as included therein.

What is claimed is:

1. A set of tape cassettes of successively larger sizes from a small size cassette to a large size cassette, each cassette having a housing elongated in a longitudinal direction and having a front face with a tape accommodating opening symmetrical about a centerline extending in a lateral direction transverse to said longitudinal direction and midway between side faces of said housing, said housing further having a bottom face with a plurality of cassette guide grooves therein parallel to each other and extending transversely of said housing and each guide groove being engagable with a corresponding guide projection on a cassette holder for guiding the cassette into the cassette holder; said opening and said cassette guide grooves in each cassette being positioned, in each of the cassettes, in the same position relative to the center line of the cassette housing, and a distance in the longitudinal direction between neighboring cassette guide grooves and a distance in the longitudinal direction between the cassette guide grooves closest to the side faces and the side faces in the housing of all but the smallest of the tape cassettes of the set being smaller than a width of the small size cassette in the lateral direction, whereby the spacing of the cassette holder projections prevents insertion of the cassettes into the cassette holder in the longitudinal direction of the cassettes.

2. A set of tape cassettes as claimed in claim 1 in which each of the cassette guide grooves has a length greater than a depth of the tape accommodating opening in the lateral direction in each of the tape cassettes.

3. A set of tape cassettes as claimed in claim 1 or 2 in which there are three cassette guide grooves in each tape cassette.

4. A set of tape cassettes as claimed in claim 1 or 2 in which there are at least three cassette guide grooves in each tape cassette, and each of said tape cassettes has a central cassette guide groove at a central portion of the cassette with respect to the longitudinal direction, and outer cassette guide grooves on opposite sides of said central guide groove.

5. A set of tape cassettes as claimed in claim 4 in which said central cassette guide groove extends further in the lateral direction than said outer cassette guide grooves.

6. A set of tape cassettes as claimed in claim 5 in which each cassette guide groove has opposite side walls and an entrance opening at the front face of said cassette, and at least one side wall is inclined away from an opposite side wall at said entrance opening.

7. A set of tape cassettes as claimed in claim 1 in which each cassette guide groove has opposite side walls and an entrance opening at the front face of said cassette, and at least one side wall is inclined away from an opposite side wall at said entrance opening.

8. A set of tape cassettes as claimed in claim 1 wherein said cassette guide grooves have opposite side walls, and at least one of said cassette guide grooves has a larger distance between said opposite side walls in a portion of said guide groove extending from said front face of said cassette than the distance between the opposite side walls in an inner end portion of said guide groove, and at least one of said sidewalls has a stepped portion between the portion with the larger distance between the side walls and the portion in the inner end portion of the guide groove.

9. A set of tape cassettes as claimed in claim 8 in which said stepped portion is inclined to the lateral direction of said cassette guide groove.

10. A set of tape cassettes as claimed in claim 9 in which the stepped portion is on only one side of said cassette guide groove.

11. A set of tape cassettes as claimed in claim 1 in which each of the tape cassettes has a longitudinal cassette guide groove, said longitudial cassette guide groove being provided in the bottom face of said cassette housing and extending in a direction parallel to the longitudinal direction of said housing and being cooperable with a further guide projection on a cassette holder for guiding the cassette into the cassette holder in the longitudinal direction of the cassette, said longitudinal cassette guide groove having a cassette positioning recess therein at a position along the length thereof and cooperable with a cassette positioning projection in the cassette holder for positioning of the cassette in the holder, said longitudinal cassette guide grooves in respective different sized cassettes being spaced an equal distance from one of the front face and a rear face of the housing, and said cassette positioning recesses being disposed in the same relative position with respect to said center line.

12. A set of cassettes as claimed in claim 11 in which said cassette positioning recess of each cassette is at a central position along said longitudinal cassette guide groove with respect to the longitudinal direction.

13. A set of cassettes as claimed in claim 12 in which said cassette positioning recess of each cassette has a circular shape.

14. A set of cassettes as claimed in claim 12 in which said cassette positioning recess of each cassette has a polygonal shape.

15. A set of cassettes as claimed in any one of claims 12-14 in which said cassette positioning recess has a shape for accomodating a fastening screw therein fastening an upper half and a lower half of said housing to each other.

* * * * *

UNITED STATES PATENT AND TRADEMARK OFFICE
CERTIFICATE OF CORRECTION

PATENT NO. :     5,240,200
DATED      :     August 31, 1993
INVENTOR(S) :    Akihiro NISHIMURA et al.

It is certified that error appears in the above-identified patent and that said Letters Patent is hereby corrected as shown below:

On the cover page, in item [30], "March 31, 1990" should read --March 30, 1990--.

Signed and Sealed this

Nineteenth Day of May, 1998

Attest:

BRUCE LEHMAN

*Attesting Officer*            *Commissioner of Patents and Trademarks*